UNITED STATES PATENT OFFICE.

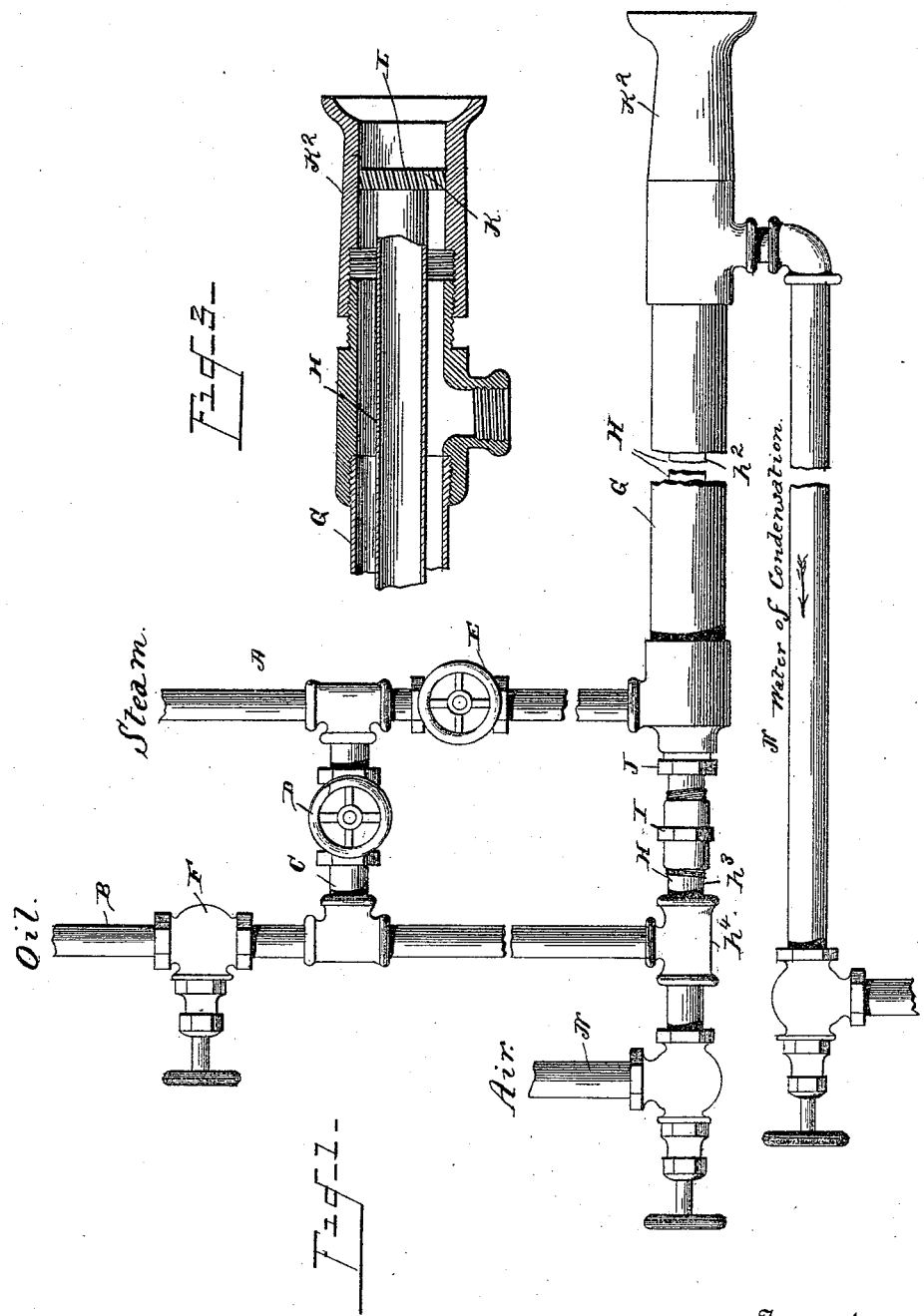

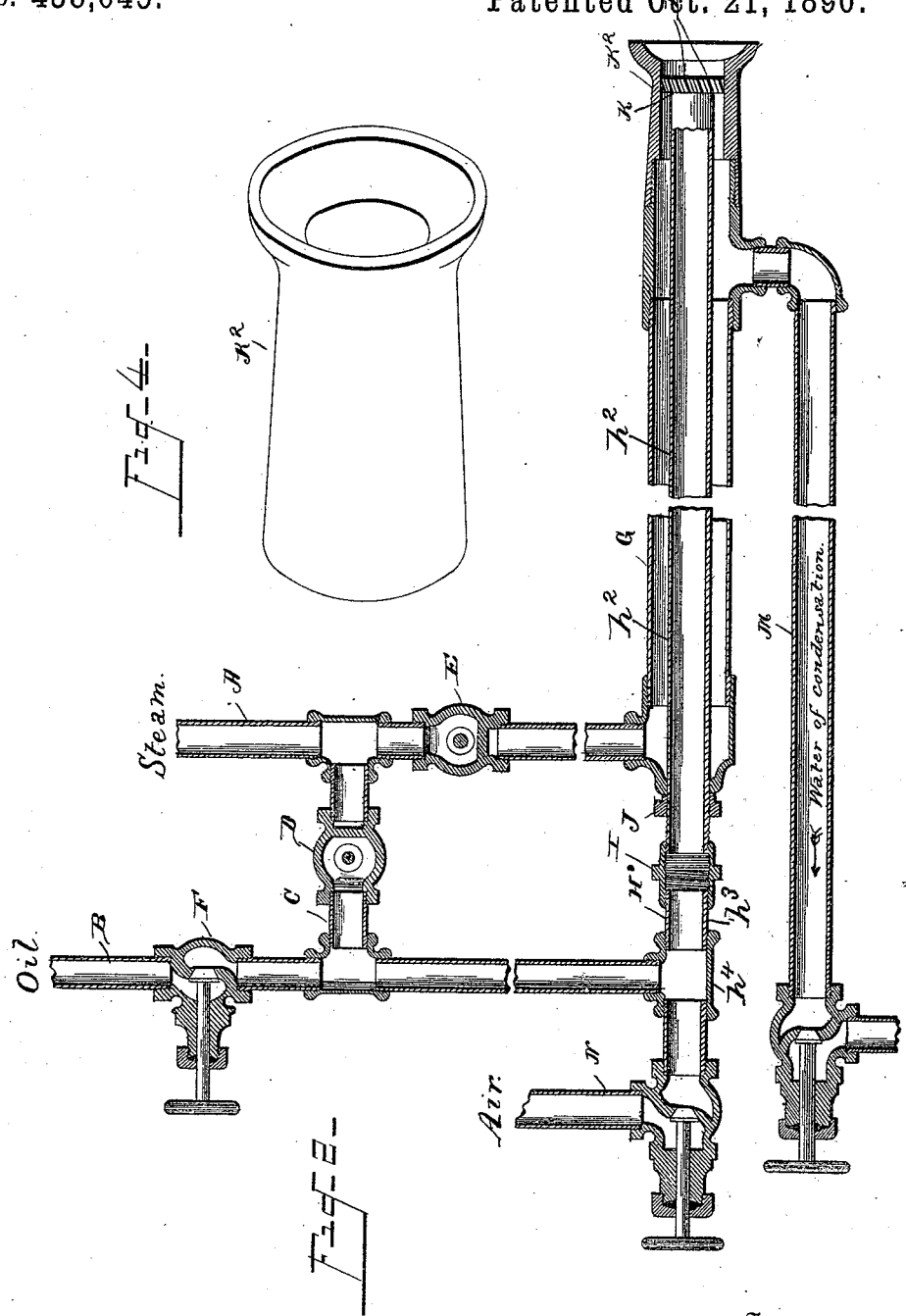

WILLIAM N. ROBINSON, OF MARION, OHIO.

OIL-BURNER.

SPECIFICATION forming part of Letters Patent No. 438,645, dated October 21, 1890.

Application filed January 4, 1890. Serial No. 335,932. (No model.)

*To all whom it may concern:*

Be it known that I, WILLIAM N. ROBINSON, a citizen of the United States, residing at Marion, in the county of Marion and State of Ohio, have invented a new and useful Oil-Burner, of which the following is a specification.

My invention relates to improvements in oil-burners, and is intended especially for use in burning lime, brick, and tile, but is adapted for use in boiler-furnaces and for other purposes.

The invention consists in certain novel features hereinafter described and claimed.

In the accompanying drawings, Figure 1 is a plan view of the burner. Fig. 2 is a longitudinal section of the burner. Fig. 3 is a similar view showing the nozzle adjusted to a different position. Fig. 4 is a detail perspective view of the nozzle.

Referring to the drawings by letter, A designates the steam-supply pipe, and B the oil-supply pipe, which may be of any desired length, according to the circumstances of each case, and which are connected by a cross-pipe C, provided with a valve D. The steam-supply pipe is provided with a valve E below the pipe C, and the oil-supply pipe is provided with a valve F above the pipe C. The lower end of the steam-supply pipe communicates with the interior of a large pipe G, and the lower end of the oil-supply pipe communicates with a smaller pipe H, which is composed of two parts or sections $h^2$ and $h^3$, the former of which is arranged within the pipe G and projects through the end of the same, and the latter of which is connected by a T-coupling $h^4$ with the lower end of the oil-supply pipe B. The adjoining ends of the pipe-sections $h^2$ $h^3$ are provided with right and left hand screw-threads, and are connected by a right and left threaded sleeve or nut I, having a wrench-seat to enable it to be conveniently turned by means of an ordinary wrench. It will be seen that the pipe-section $h^3$ is attached permanently to the coupling $h^4$; hence by turning the sleeve or nut I the section $h^2$ may be adjusted longitudinally within the steam-pipe G. A jam-nut J is mounted upon the projecting end of the pipe-section $h^2$, and is adapted to be screwed up against the end of the steam-pipe G in order to make a tight joint and to retain the pipe-section $h^2$ in any position to which it may be adjusted.

The end of the pipe-section $h^2$ within the steam-pipe G is provided with a spraying-disk K, which is equal in diameter to the internal diameter of the nozzle or casing $K^2$, attached to the pipe G, and is provided in its edge with the obliquely-arranged grooves L. The steam passes through the pipe G and escapes through these grooves L in a series of small jets, so as to take up the oil and carry it from the pipe H, and thereby produce a very intense flame. A drip-pipe M leads from the pipe G near the end of the same, so as to carry off the water caused by the steam condensing against the disk or nozzle K.

An air-supply pipe N communicates with the oil-supply pipe at the junction of the same with the pipe H, so as to admit air to the said pipe, as may be needed, according to the pressure on the oil.

The construction and arrangement of the several parts of my improved burner will be readily understood from the foregoing description, taken in connection with the accompanying drawings, and the advantages of the device are thought to be obvious.

The steam and oil are conveyed through the pipes G and H to the ends of said pipes where the oil is ignited. The steam creates a suction on the oil, so as to maintain a steady even flow of the same, and consequently provides a strong constant flame. The obliquely-arranged grooves in the edge of the spreading-disk cause the steam to be discharged in a circle, so that the oil will be caught up and sprayed over a great surface and prevented from being driven to one point in a direct line from the burner. By adjusting the inner pipe-section $h^2$ longitudinally, as above described, the spreading-disk will be moved to and away from the end of the casing or nozzle $K^2$, so that the point of combustion may be regulated at will. If it is desired to have a large volume of flame, the spreading-disk is moved near the end of the large pipe, while if it is desired to have a smaller concentrated flame at a distance from the end of the burner the disk is moved inward from the end of the outer pipe. By means of the valves E and F the flow of steam and oil can be regulated and controlled, and by closing the valve F so as to cut off the flow of the oil and then closing the valve E and opening the valve D the steam can be made to pass through the pipe H, and thereby clean the said pipe by blowing therefrom any sediment or particles of carbon that may lodge therein. The several parts of the burner are detachably connected, so that in case any one part should be damaged it can be readily removed and repaired. The air-supply pipe is especially advantageous in regulating the point of combustion, as by increasing or diminishing the pressure of the air the regulating of the point of combustion by adjusting the pipe-section $h^2$ is rendered certain. In the event of the oil being thick and sluggish the valve D is opened slightly, so as to allow a small jet of steam to enter the oil-supply pipe, and thereby increase the flow of the oil.

When desired, a needle-valve may be used for regulating the flow of the oil in lieu of the globe-valve herein shown.

Having thus described my invention, what I claim, and desire to secure by Letters Patent, is—

In a hydrocarbon-burner, the combination of the steam-pipe G, having the nozzle or casing $K^2$, the valved steam-supply pipe A, the valved oil-supply pipe B, the T-coupling $h^4$ at the lower end of the latter, the air-pipe connected with one end of said coupling, the oil-pipe H, composed of two sections, one of which $h^3$ is connected with the coupling $h^4$, while the other section $h^2$ is located partly in the steam-pipe G, and provided with a spraying-disk K, the adjoining ends of the pipe-sections $h^2$ $h^3$ being provided with right and left hand screw-threads, the right and left threaded sleeve I, the jam-nut J, and a valved pipe M, connected with the steam-pipe G for carrying off water of condensation, substantially as set forth.

In testimony that I claim the foregoing as my own I have hereto affixed my signature in presence of two witnesses.

WILLIAM N. ROBINSON.

Witnesses:
JOHN W. CLARK,
W. H. ROBINSON.